(12) United States Patent
Fan

(10) Patent No.: US 9,841,628 B2
(45) Date of Patent: Dec. 12, 2017

(54) LIQUID CRYSTAL DISPLAY DEVICE AND ELECTRONIC EQUIPMENT

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 188 days.

(21) Appl. No.: 14/905,785

(22) PCT Filed: Dec. 22, 2015

(86) PCT No.: PCT/CN2015/098338
§ 371 (c)(1),
(2) Date: Jan. 16, 2016

(87) PCT Pub. No.: WO2017/071031
PCT Pub. Date: May 4, 2017

(65) Prior Publication Data
US 2017/0227819 A1    Aug. 10, 2017

(30) Foreign Application Priority Data

Oct. 27, 2015 (CN) .......................... 2015 1 0705110

(51) Int. Cl.
*G02F 1/1335* (2006.01)
*G02F 1/1337* (2006.01)
(Continued)

(52) U.S. Cl.
CPC ...... *G02F 1/133621* (2013.01); *G02F 1/1337* (2013.01); *G02F 1/1362* (2013.01);
(Continued)

(58) Field of Classification Search
CPC .................... G02F 1/133621; G02F 1/133514
See application file for complete search history.

(56) References Cited

U.S. PATENT DOCUMENTS

2008/0158480 A1* 7/2008 Ii ....................... G02F 1/133617
349/71
2011/0281388 A1* 11/2011 Gough ................... B82Y 20/00
438/47
(Continued)

*Primary Examiner* — Jia Pan
(74) *Attorney, Agent, or Firm* — Andrew C. Cheng

(57) ABSTRACT

The present invention provides a liquid crystal display device including a backlight module and a liquid crystal panel including a color film substrate, an array substrate, and a liquid crystal layer sandwiched between the color film substrate and the array substrate, the backlight module is a blue light source; the array substrate includes a glass substrate and a color layer provided on the glass substrate and a polarized layer laminated on the color layer. The polarized layer is disposed adjacent to the liquid crystal layer. The color layer includes a blue light filter layer and a color unit layer which is laminated on the blue light filter layer and on the back of the surface of the polarized layer. The color unit layer includes a plurality of color units, and each of the color units includes a red color quantum rod layer, a green quantum rod layer and a transparent color filter layer. The present invention also discloses an electronic equipment.

7 Claims, 1 Drawing Sheet

(51) Int. Cl.
  *G02F 1/1362* (2006.01)
  *G02F 1/1333* (2006.01)
(52) U.S. Cl.
  CPC .. *G02F 1/133514* (2013.01); *G02F 1/133528*
      (2013.01); *G02F 2001/133302* (2013.01);
      *G02F 2001/133538* (2013.01); *G02F 2202/36*
      (2013.01)

(56) References Cited

U.S. PATENT DOCUMENTS

| | | | | |
|---|---|---|---|---|
| 2012/0087107 A1* | 4/2012 | Kunimasa | ......... | G02F 1/133514 362/84 |
| 2012/0287381 A1* | 11/2012 | Li | ............ | G02F 1/133617 349/106 |
| 2013/0135558 A1* | 5/2013 | Kim | ............ | G02F 1/133528 349/62 |
| 2013/0242228 A1* | 9/2013 | Park | ............ | G02F 1/133617 349/61 |
| 2014/0132890 A1* | 5/2014 | Zhang | ............ | G02F 1/133514 349/69 |
| 2014/0192294 A1* | 7/2014 | Chen | ............ | F21V 9/08 349/69 |
| 2014/0368766 A1* | 12/2014 | Shibata | ............ | G02B 5/201 349/61 |
| 2015/0205159 A1* | 7/2015 | Itou | ............ | G02F 1/133514 349/110 |
| 2015/0301408 A1* | 10/2015 | Li | ............ | G02F 1/133621 362/84 |
| 2016/0070136 A1* | 3/2016 | Jang | ............ | G02F 1/133514 349/61 |
| 2016/0320664 A1* | 11/2016 | Kang | ............ | G02F 1/133528 |

\* cited by examiner

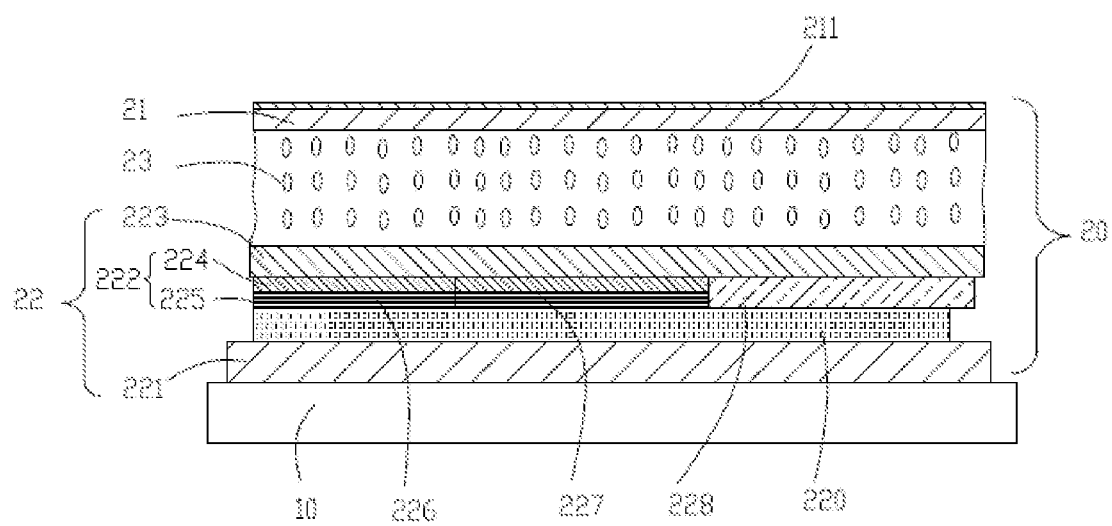

LIQUID CRYSTAL DISPLAY DEVICE AND ELECTRONIC EQUIPMENT

CROSS REFERENCE

This application claims the priority of Chinese Patent Application No. 201510705110.2, entitled "Liquid crystal display device and electronic equipment", filed on Oct. 27, 2015, the disclosure of which is incorporated herein by reference in its entirety.

FIELD OF THE INVENTION

The present invention relates to an LCD technology field, and more particularly to an LCD device and an electronic equipment.

BACKGROUND OF THE INVENTION

At present, the LCD device as a display part of the electronic devices have been widely used in various electronic products, LCD device includes a liquid crystal panel and a backlight module, the backlight module is used to provide light to the liquid crystal panel to implement screen display. Among them, the liquid crystal panel includes an array substrate and color film substrate disposed opposite, and the liquid crystal interposed between the array substrate and the color film substrate, which is realized by the screen color RGB (tricolor wafer) on the color film substrate or the array substrate forming a pixel unit, and then form a color pixel by white light backlight module. While this kind of structure when the light passes through the RGB, it will absorb between R, G, B sub-pixels each other light, so require a higher backlight, and the display is difficult to achieve higher color saturation of the screen.

SUMMARY OF THE INVENTION

The invention relates to a liquid crystal display device capable of improving color saturation while saving backlight.

The invention provides a liquid crystal display device, which includes a backlight module and a LCD panel. The LCD panel includes a color film substrate, an array substrate and a liquid crystal layer sandwiched between the color film substrate and the array substrate. The invention is characterized in that the backlight module is a blue light source. The array substrate includes a glass substrate and a color layer which is provided on the glass substrate and a polarized layer which is laminated on the color layer. The polarizing layer is disposed adjacent to the liquid crystal layer. The color layer comprises a blue light filter layer and a color unit layer, which includes a plurality of color units. Each of the color units includes a red color quantum rod layer, a green quantum rod layer and a transparent color filter layer, wherein the red quantum rod layer and green quantum rod layer are laminated on the blue light filter layer. The transparent color filter layer is stacked on the polarized layer.

Wherein a polarizer is provided on the surface of the color film substrate facing away from the liquid crystal layer.

Wherein an alignment film and a drive array unit layer are provided between the glass substrate and the color layer.

Wherein the major axis directions of the red and green quantum rod layers are perpendicular to the lighting direction of the backlight module.

Wherein the major axis directions of the red and green quantum rod layers are parallel to the transmission axis direction of the polarizing layer.

Wherein, the array substrate also has a plurality of partitions, the partitions are placed alternately between the red quantum rod layer and the green quantum rod layer, between the red quantum rod layer and the transparent color filter layer, and between the green quantum rod layer and the transparent color filter layer.

The invention provides an electronic equipment, which includes a backlight module and a LCD panel. The LCD panel includes a color film substrate, an array substrate and a liquid crystal layer clamping between the color film substrate and the array substrate. The backlight module has a blue light source, and the array substrate includes a glass substrate and a color layer which is provided on the glass substrate and a polarized layer which is laminated on the color layer. The polarized layer is disposed adjacent to the liquid crystal layer. The color layer includes the blue light filter layer and the color unit layer which is laminated on the blue light filter layer and away from the surface of the polarized layer. The color unit layer includes a plurality of color units, and each of the color units includes a red color quantum rod layer, a green quantum rod layer and a transparent color filter layer.

Wherein a polarizer is provided on the surface of the color film substrate facing away from the liquid crystal layer.

Wherein the major axis directions of the red and green quantum rod layers are perpendicular to the lighting direction of the backlight module.

Wherein the major axis directions of the red and green quantum rod layers are parallel to the transmission axis direction of the polarizing layer.

This invention provides liquid crystal display device adopts the blue light as a background light, and relatively the quantum rod is used as the color layer to avoid the fluorescence absorption problem between the color unit (mainly the red quantum rod absorbs the green light), enhance the photosynthetic efficiency, the light energy consumption on the traditional LCD display significantly reduced, while improving the screen color saturation.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

FIG. 1 is a structure diagram of one embodiment according to the liquid crystal display device of the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Please refer to FIG. 1. Preferred embodiments of the present invention there provide a liquid crystal display device comprising the backlight module 10 and the liquid crystal panel 20. The liquid crystal panel 20 includes a color film substrate 21, an array substrate 22 and a liquid crystal layer 23 sandwiched between the color film substrate 21 and the array substrate 22. The backlight module 10 uses a blue light source. The array substrate 22 includes a glass substrate 221 and a color layer 222 provided on the glass substrate 221, and the polarized layer 223 is laminated on the color layer 222. The polarized layer 223 is disposed adjacent to the liquid crystal layer 23. The color layer 222 includes a blue light filter layer 224 and the color unit layer 225. The color unit layer includes a plurality of color units (not marked), each color unit includes a red quantum rod layer (R) 226, a green quantum rod layer (G) 227 and a transparent color filter layer (T) 228, wherein the red quantum rod layer 226 and the green quantum rod layer 227 are stacked on the blue light filter layer 224 and the major axis directions of the red quantum rod layer 226 and the green quantum rod layer 227 are perpendicular to the light direction of the backlight module 10.

In this embodiment, the LCD device further comprises a plastic box, and the plastic box is located between the color film substrate 21 and the array substrate 22 and seals the liquid crystal layer 23. The color film substrate 21 opposite to the surface of the liquid crystal layer 23 is equipped with a polarizer 211. The array substrate 22 includes an alignment layer (not shown) and a drive array unit layer 220. The drive array unit layer 220 is placed on the glass substrate. The alignment layer is placed on the drive array unit layer 220. The color layer is placed on the alignment layer. The polarized layer 223 is placed on the color layer 222 and disposed adjacent to the liquid crystal layer. The red quantum rod layer 226 and the green quantum rod layer 227 are stacked on the blue light filter layer 224. The transparent color filter 225 is stacked on the polarized layer 223, and composes with the red quantum rod layer 226, the green quantum rod layer 227 and the blue light filter layer 224 to form a layer structure in the same thickness.

In the LCD device of the present invention, the color layer 222 is equivalent to the pixel layer in the LCD panel. The quantum rod is used instead of the traditional color pixel filter chip structure. Since the light-emitting properties of the quantum rod and quantum dots has similar characteristics, Its emission spectrum of the wavelength can be adjusted through the quantum rod diameter, and when the blue light (either natural light or polarized light) is excited by the quantum rod emitting light, the quantum rod emits the polarized light. The backlight module light source is blue light, so the quantum rod is used as color layer for LCD device of the present invention to avoid the different colors absorbing light source from each other between the color layers. It can be relatively significant reduction in the conventional liquid crystal display light energy consumption, while the high color saturation of the screen increases. Because the backlight module light source is blue light, the blue light is residual after blue light excite red quantum rod. The presence of the residual blue light will decrease the color purity of the red light. The present invention uses the blue filter layer 224 cooperating with the red quantum rod layer (R) 226 and green quantum rod layer (G) 227, effectively to avoid the red quantum rod blue light residue affected and to ensure color saturation.

Further, the major axis directions of the red quantum rod layer 226 and green quantum rod layer 227 are parallel to the transmission axis direction of the polarized layer 223, and the liquid crystal panel can be made to have a high contrast.

Further, the array substrate 20 also has a number of partitions (not shown), the partitions are interposed between the red and the green quantum rod layers, between the red quantum rod layer and the transparent color filter layer and between green quantum rod layer and the transparent color filter layer. The partitions can be supported between the color film layer 21 and the array substrate 22, for preventing the fluorescence reabsorption phenomenon of the red quantum rod layer and the green quantum rod layer, and enhancing the luminous efficiency.

What is claimed is:

1. A liquid crystal display device, comprising a backlight module and a liquid crystal panel, and the liquid crystal panel includes a color film substrate, an array substrate and a liquid crystal layer sandwiched between the color film substrate and array substrate, characterized in that a light source of the backlight module is blue; the array substrate includes a glass substrate and a color layer provided on the glass substrate, and a polarized layer laminated with the color layer, the polarized layer disposed adjacent to the liquid crystal layer, the color layer comprises a blue light filter layer is stacked directly on the polarized layer and a color unit layer, the color unit layer includes a plurality of color units, each of the color units includes a red color quantum rod layer, a green quantum rod layer and a transparent color filter layer, wherein the red and green quantum rod layers are stacked directly on the blue light filter layer, the transparent color filter layer is stacked directly on the polarized layer; wherein a polarizer is disposed on the surface of the color film substrate facing away from the liquid crystal layer; and wherein an alignment layer and a drive array unit layer are provided between the glass substrate and the color layer.

2. The LCD device according to claim 1, wherein the major axis directions of the red and green quantum rod layers are perpendicular to a lighting direction of the backlight module.

3. The LCD device according to claim 1, wherein the major axis directions of the red and green quantum rod layers are parallel to the transmission axis direction of the polarized layer.

4. The LCD device according to claim 1, wherein a plurality of partitions are placed on the array substrate, the partitions are arranged alternately between the red quantum rod layer and the green quantum rod layer, between the red quantum rod layer and the transparent color filter layer, and between the green quantum rod layer and the transparent color filter layer.

5. An electronic equipment comprising a LCD device, the LCD device includes a backlight module and a liquid crystal panel, and the liquid crystal panel includes a color film substrate, an array substrate and a liquid crystal layer sandwiched between the color film substrate and the array substrate, characterized in that a light source of the backlight module is blue; the array substrate includes a glass substrate and a color layer provided on the glass substrate, and a polarized layer laminated with the color layer, the polarized layer disposed adjacent to the liquid crystal layer, the color layer comprises a blue light filter layer is stacked directly on the polarized layer and a color unit layer, the color unit layer includes a plurality of color units, each of the color units includes a red color quantum rod layer, a green quantum rod layer and a transparent color filter layer, wherein the red and green quantum rod layers are stacked directly on the blue light filter layer, and the transparent color filter layer is stacked directly on the polarized layer; wherein a polarizer is disposed on the surface of the color film substrate facing away from the liquid crystal layer; and wherein an alignment layer and a drive array unit layer are provided between the glass substrate and the color layer.

6. The electronic equipment according to claim 5, wherein the major axis directions of the red and green quantum rod layers are perpendicular to a lighting direction of the backlight module.

7. The electronic equipment according to claim 5, wherein the major axis directions of the red and green quantum rod layers are parallel to the transmission axis direction of the polarized layer.

* * * * *